(12) United States Patent
Spengler et al.

(10) Patent No.: US 12,500,060 B2
(45) Date of Patent: Dec. 16, 2025

(54) ELECTROMAGNETIC LENS

(71) Applicant: IMS Nanofabrication GmbH, Brunn am Gebirge (AT)

(72) Inventors: Christoph Spengler, Vienna (AT); Dietmar Puchberger, Vienna (AT); Johannes Leitner, Vienna (AT); Theodor Adaktylos, Vienna (AT); Stefan Eder-Kapl, Vienna (AT)

(73) Assignee: IMS Nanofabrication GmbH, Brunn am Gebirge (AT)

( * ) Notice: Subject to any disclaimer, the term of this patent is extended or adjusted under 35 U.S.C. 154(b) by 722 days.

(21) Appl. No.: 17/811,234

(22) Filed: Jul. 7, 2022

(65) Prior Publication Data
US 2023/0015805 A1    Jan. 19, 2023

(30) Foreign Application Priority Data
Jul. 14, 2021    (EP) ..................................... 21185599

(51) Int. Cl.
*H01J 37/141*    (2006.01)
*H01J 37/145*    (2006.01)

(52) U.S. Cl.
CPC .......... *H01J 37/141* (2013.01); *H01J 37/145* (2013.01)

(58) Field of Classification Search
CPC ................... H01J 37/141; H01J 37/145; H01J 2237/1415; H01J 37/143; H01J 37/3177
See application file for complete search history.

(56) References Cited

U.S. PATENT DOCUMENTS

| | | | |
|---|---|---|---|
| 2,369,796 | A | 2/1945 | Ramberg |
| 2,503,173 | A | 4/1950 | Reisner |

(Continued)

FOREIGN PATENT DOCUMENTS

| | | |
|---|---|---|
| DE | 869995 C | 3/1953 |
| DE | 892036 C | 10/1953 |

(Continued)

OTHER PUBLICATIONS

Extended European Search Report for European Application No. 21175588.9, Search Completed Nov. 8, 2021, Mailed Nov. 16, 2021, 12 pgs.

(Continued)

*Primary Examiner* — David E Smith
*Assistant Examiner* — Christopher J Gassen
(74) *Attorney, Agent, or Firm* — KPPB LLP

(57) ABSTRACT

A fine-adjustable electromagnetic lens for a charged-particle optical apparatus comprises a magnetic circuit assembly including one or more ring magnets, and a sleeve insert of generally rotational symmetry around a longitudinal axis. The sleeve insert surrounds a passage opening extending along the longitudinal axis, and comprises several electrically conductive electrode elements configured to generate an electrostatic field within the passage opening. The ring magnets are arranged circumferentially around an inner yoke shell and surrounded by an outer yoke shell; the inner yoke shell in turn surrounds a central portion of the sleeve insert. The ring magnets are magnetized such that the two magnetic poles are oriented towards the inner and outer yoke shell, respectively. The inner and outer yoke shell together with the ring magnets form a magnetic circuit having at least one gap, in order to generate a magnetic field reaching inwards into the passage opening and spatially overlapping with the electrostatic field generated by the sleeve insert.

15 Claims, 6 Drawing Sheets

(56) References Cited

U.S. PATENT DOCUMENTS

| | | |
|---|---|---|
| 2,714,678 A | 8/1955 | Otto |
| 3,100,260 A | 8/1963 | Wilska |
| 4,806,766 A | 2/1989 | Chisholm |
| 4,912,405 A | 3/1990 | Richardson |
| 6,443,699 B1 | 9/2002 | Mashey |
| 6,768,125 B2 | 7/2004 | Platzgummer et al. |
| 6,858,118 B2 | 2/2005 | Platzgummer et al. |
| 7,067,820 B2 | 6/2006 | Buijsse |
| 7,199,373 B2 | 4/2007 | Stengl et al. |
| 7,214,951 B2 | 5/2007 | Stengl et al. |
| 7,276,714 B2 | 10/2007 | Platzgummer et al. |
| 7,772,574 B2 | 8/2010 | Stengl et al. |
| 7,781,748 B2 | 8/2010 | Platzgummer |
| 8,183,543 B2 | 5/2012 | Platzgummer |
| 8,222,621 B2 | 7/2012 | Fragner et al. |
| 8,304,749 B2 | 11/2012 | Platzgummer et al. |
| 8,378,320 B2 | 2/2013 | Platzgummer |
| 8,546,767 B2 | 10/2013 | Platzgummer et al. |
| 9,053,906 B2 | 6/2015 | Platzgummer |
| 9,165,745 B2 | 10/2015 | Luo |
| 9,269,543 B2 | 2/2016 | Reiter et al. |
| 9,443,699 B2 | 9/2016 | Platzgummer et al. |
| 9,495,499 B2 | 11/2016 | Platzgummer et al. |
| 9,520,268 B2 | 12/2016 | Platzgummer |
| 9,568,907 B2 | 2/2017 | Platzgummer et al. |
| 9,653,263 B2 | 5/2017 | Platzgummer et al. |
| 9,922,796 B1 | 3/2018 | Frosien et al. |
| 10,325,757 B2 | 6/2019 | Platzgummer et al. |
| 10,483,080 B1 | 11/2019 | Cook et al. |
| 12,040,157 B2 | 7/2024 | Platzgummer et al. |
| 2004/0135102 A1 | 7/2004 | Muraki et al. |
| 2005/0242303 A1 | 11/2005 | Platzgummer |
| 2006/0033035 A1 | 2/2006 | Itzkovitch et al. |
| 2009/0057571 A1 | 3/2009 | Goto |
| 2010/0155597 A1 | 6/2010 | Preikszas et al. |
| 2011/0049393 A1 | 3/2011 | De Boer et al. |
| 2012/0091318 A1 | 4/2012 | Wieland et al. |
| 2012/0286173 A1 | 11/2012 | Van De Peut et al. |
| 2014/0264085 A1 | 9/2014 | Van De Peut et al. |
| 2015/0311031 A1 | 10/2015 | Platzgummer et al. |
| 2016/0064180 A1 | 3/2016 | Ren et al. |
| 2020/0161079 A1* | 5/2020 | Ren .................. H01J 37/143 |
| 2020/0312619 A1 | 10/2020 | Mangnus et al. |
| 2022/0384143 A1 | 12/2022 | Platzgummer et al. |
| 2023/0052445 A1 | 2/2023 | Platzgummer et al. |
| 2023/0360878 A1 | 11/2023 | Puchberger et al. |
| 2023/0360880 A1 | 11/2023 | Eder-kapl et al. |
| 2024/0021403 A1 | 1/2024 | Puchberger et al. |
| 2024/0212970 A1 | 6/2024 | Spengler et al. |

FOREIGN PATENT DOCUMENTS

| | | | |
|---|---|---|---|
| DE | 893107 C | 10/1953 | |
| DE | 1035813 B | 8/1958 | |
| EP | 1471562 A2 | 10/2004 | |
| EP | 2187427 A2 | 5/2010 | |
| EP | 2363875 A1 | 9/2011 | |
| EP | 2587517 A1 | 5/2013 | |
| GB | 689527 A | 4/1953 | |
| JP | 2007311117 A | * 11/2007 | ............ H01J 37/143 |
| WO | 2012041464 A1 | 4/2012 | |

OTHER PUBLICATIONS

Extended European Search Report for European Application No. 22171589.9, Search completed Oct. 24, 2022, Mailed Nov. 7, 2022, 5 pgs.

Extended European Search Report for European Application No. 22172309.1, Search completed Dec. 19, 2022, Mailed Jan. 3, 2023, 22 pgs.

Extended European Search Report for European Application No. 22185177.7, Search completed Feb. 16, 2023, Mailed Feb. 27, 2023, 18 pgs.

Extended European Search Report for European Application No. 22189892.7, Search completed Feb. 20, 2023, Mailed Mar. 21, 2023, 10 pgs.

Extended European Search Report for European Application No. 22216094.7, Search completed May 23, 2023, Mailed Jun. 6, 2023, 6 pgs.

Extended European Search Report for European Application No. 21185599.4, Search Completed Jan. 4, 2022, Mailed Jan. 17, 2022, 6 pgs.

Mueller, , "Regelbare magnetostatische Linsensysteme fur Elektronenmikroskope—[Variable magnetostatic lens systems for electron microscopes]", Zeitschrift fur Wissenschaftliche Mikroskopie und Furmikroskopische Technik, Hirzel Verlag, Stuttgart, De, vol. 63, No. 5, May 31, 1957, pp. 303-328, XP009521932.

* cited by examiner

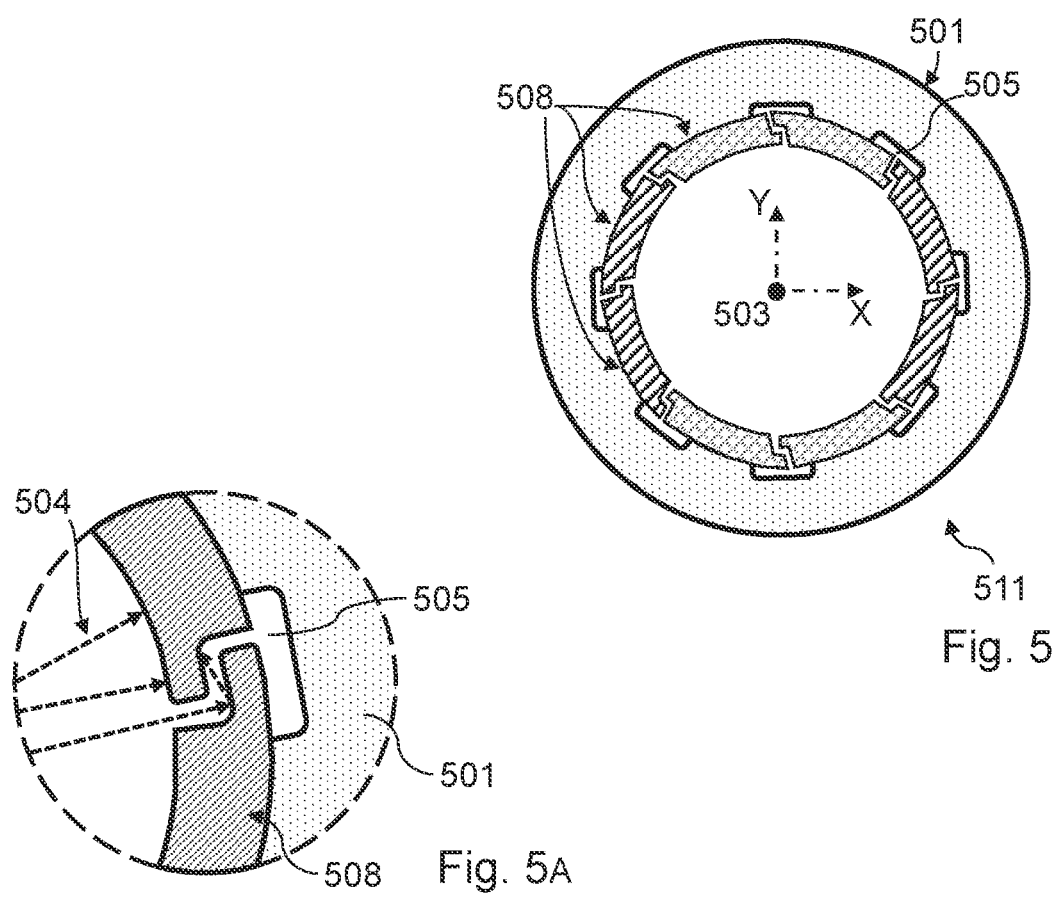
Fig. 5
Fig. 5A
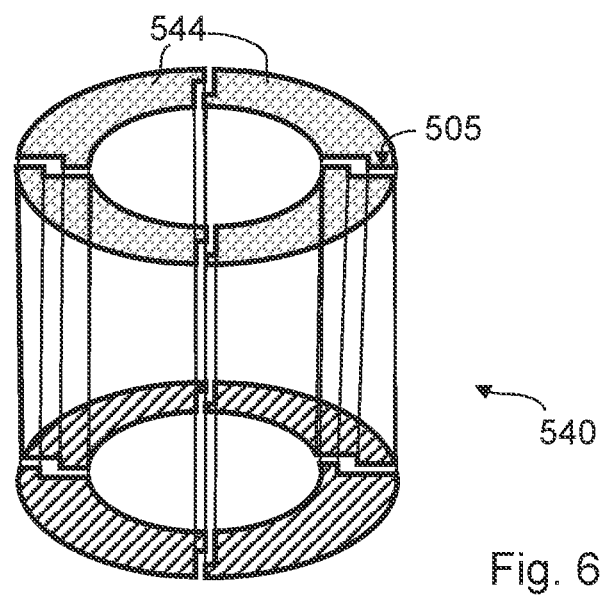
Fig. 6

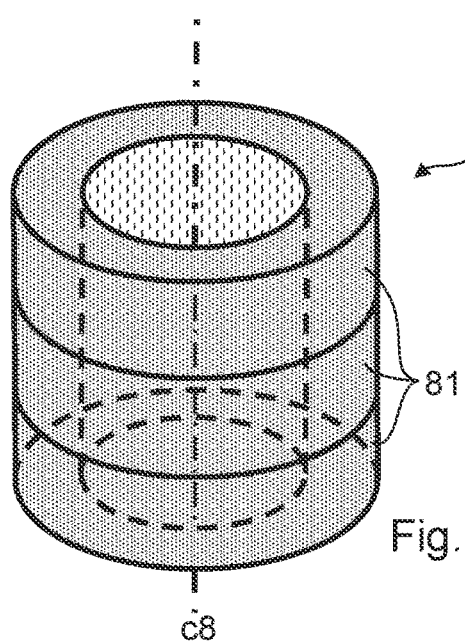
Fig. 8A
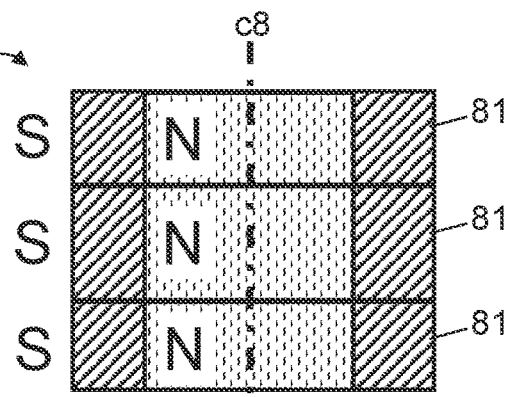
Fig. 8B
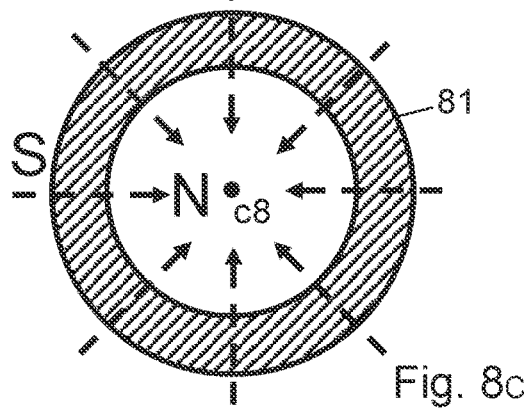
Fig. 8C
Fig. 8
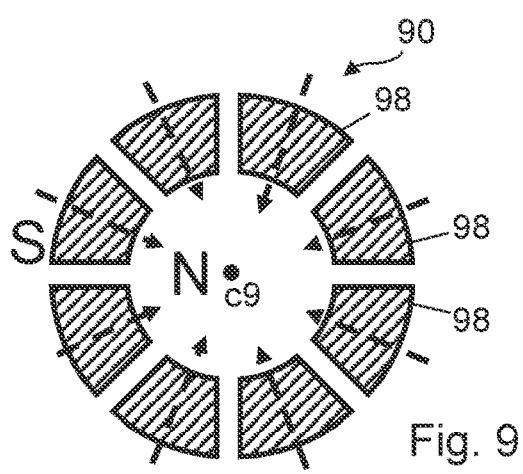
Fig. 9
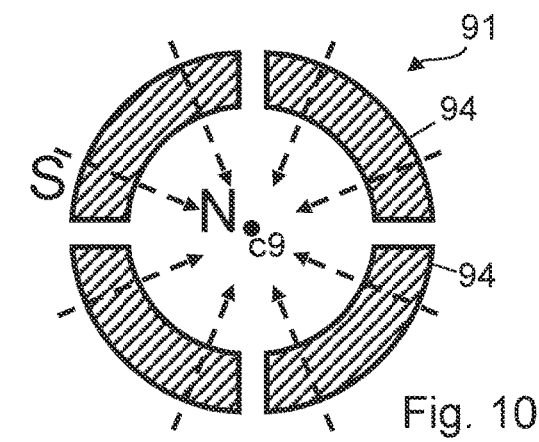
Fig. 10
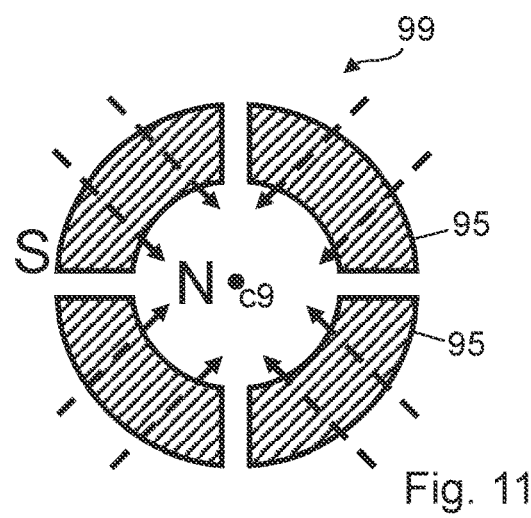
Fig. 11

ELECTROMAGNETIC LENS

FIELD OF THE INVENTION

The present invention relates to an electromagnetic lens configured to modify a charged-particle beam of a charged-particle optical apparatus for lithography writing and like processing purposes, including nano-patterning. Such a lens is provided with a passage for the charged-particle beam along a longitudinal direction, which would correspond to the propagation direction of the charged-particle beam itself, and will usually be aligned concentrically with the optical axis of the charged-particle optical apparatus. The invention also relates to a charged-particle optical apparatus including an electromagnetic lens of the mentioned type.

The applicant has realized charged-particle multi-beam apparatuses, which incorporate one or more electromagnetic lenses of the mentioned type, and developed the corresponding charged-particle optical components, pattern definition devices, and writing methods for multiple beams, and commercialized a 50 keV electron multi-beam writer called eMET (electron Mask Exposure Tool) or MBMW (multi-beam mask writer), used to realize arbitrary photomasks for 193 nm immersion lithography, as well as masks for EUV lithography and templates for nanoimprint lithography. The applicants system has also been called PML2 (Projection Mask-Less Lithography) for electron beam direct writer (EBDW) applications on substrates.

BACKGROUND OF THE INVENTION

For increasing throughput in high-volume industrial manufacturing, with particular regard for mask-less lithography and direct-writing on substrates (e.g. wafers), there is the need to increase the electrical current carried by the charged-particle beam passing through the charged-particle nano-pattering apparatus; this is usually at the cost of limiting the resolution due to Coulombic interactions between the charged particles and will require a corresponding compensation by reduction of the magnitude of the optical aberrations introduced by the apparatus through other mechanisms. To this end, the applicant has developed a charged-particle multi-beam apparatus consisting of multiple parallel optical columns combined in a multi-column fashion, each column having a reduced ("slim") cross-section diameter. Such a multi-beam apparatus, of which one embodiment is discussed below referring to FIG. 4, enables significantly larger charged-particle beam electrical currents, while overcoming the limitations due to the trade-off between electrical current and optical aberrations found in single-column systems. This is due to the fact, that the total current delivered to the target is split into multiple optical axes, while the resolution limitation is dominated by the amount of current per optical axis. Single columns of this type are well known in prior art, such as U.S. Pat. No. 6,768,125, EP 2 187 427 A1 (=U.S. Pat. No. 8,222,621) and EP 2 363 875 A1 (=U.S. Pat. No. 8,378,320) of the applicant.

A typical multi-column system includes multiple optical sub-columns, each of which comprises an illuminating system that delivers a broad telecentric charged-particle beam to a pattern definition system followed by a charged-particle projection optics, which includes, e.g., a number of electrostatic and/or electromagnetic lenses. For using such a system as a high-throughput wafer-direct-writer it will be necessary to place a substantial number of sub-columns above one semiconductor wafer, e.g. in the order of 100 sub-columns. This, however, requires that each sub-column has a diameter which is a fraction of the width of the wafer, for instance in the case of a 300 mm (12") wafer, a diameter of 31 mm or below. Slim-diameter magnetic lenses, on the other hand, cannot be realized by coil-based magnetic lenses for the generation of the desired magnetic field, because reduction of the column diameter would correspond to extremely large Joule heating due to the large electrical currents needed to operate the coils for generating sufficiently strong magnetic fields. Due to the tight space requirements, there is insufficient space for an adequate temperature-control system including high-precision sensors and isotropic and homogeneous cooling, which would be required for conventional coil-based-magnetic lenses. Additionally, the tight space requirements, which result from the target diameters of the slim columns and their arrangement in a suitable multi-column system, would hinder fabrication of a suitable coil-based magnetic lens. The mentioned limitations driven by heat and geometrical requirements are severe, but can be overcome by employing magnetic lenses based on permanent magnets within a high-permeability housing body for generating the magnetic field, such as the possible embodiments of the present invention. However, such permanent-magnet based systems cannot be recalibrated after completion of manufacturing and assembly processes, and this represents a serious disadvantage with respect to coil-based magnetic lenses, whose magnetic field can be controlled by re-adjusting the electrical current passing through the coils, especially given inherent limitations on the precision of the targeted magnetic field due to manufacturing and assembly accuracies. Current precision limitations correspond to a deviation of approximately $\pm 1.0\%$ to the targeted magnetic field, which cannot be compensated for without including some additional components that allow for compensating the lack of required magnetic field precision.

Electromagnetic lenses based on permanent magnets and high-permeability housing bodies combined with electrostatic elements for fine-adjustment are known in prior art, such as U.S. Pat. No. 7,067,820, which however does not incorporate high-precision adjustment means such as multipoles, nor charged-particle-collecting calibration apertures, hence is unable to provide the means of altering the beam shape, calibrating its positions and generating a desired pattern. U.S. Pat. No. 9,165,745 discloses a permanent-magnet-based electromagnetic lens combined with a coil-based magnetic lens for fine adjustment, which has the above-mentioned heating and geometrical problems. Furthermore, the magnetic field of the above state-of-the art magnetic lenses is insufficiently confined to the space of the lens itself, causing severe cross-effects in the case of a number of lenses arranged side by side.

SUMMARY OF THE INVENTION

In view of the above, it is an object of the present invention to provide an electromagnetic lens which includes permanent magnets but allows for adjusting the optical properties (e.g. focal length) with high precision. At the same time, the effect of stray magnetic field shall be limited.

The above object is met by an electromagnetic lens configured to modify (e.g. shape, focus/defocus or otherwise manipulate) a charged-particle beam of a charged-particle optical apparatus, the lens being provided with a passage opening extending along a longitudinal axis and allowing passage of the charged-particle beam, the lens comprising a magnetic circuit assembly comprising at least one ring magnet and a yoke body and a sleeve insert, the sleeve insert surrounding the passage opening and extending between a first end and a second end thereof along the longitudinal axis, wherein the sleeve insert comprises one or more electrically conductive electrode elements, preferably at least two, which are configured to be applied respective electric potentials (with respect to the electric potential of the housing, which is identified with a ground potential) so as to generate an electrostatic field within the passage opening, and the yoke body comprising an outer yoke shell and an inner yoke shell, arranged circumferential around the longitudinal axis and comprising a magnetic permeable material, wherein the inner yoke shell is arranged surrounding at least a central portion of the sleeve insert, and the outer yoke shell surrounds the inner yoke shell and the sleeve insert, with the ring magnet(s) arranged circumferentially around the inner yoke shell and arranged between the inner and outer yoke shells, the ring magnet(s) comprising a permanent magnetic material being magnetically oriented with its two magnetic poles towards the inner yoke shell and the outer yoke shell, respectively, wherein in the magnetic circuit assembly, the inner yoke shell, the at least one ring magnet, and the outer yoke shell form a closed magnetic circuit but having at least one gap, preferably at least two gaps, located at an axial end of the inner yoke shell towards a respectively corresponding (inner surface) portion of the outer yoke shell, configured to generate a defined magnetic field reaching inwards into the passage opening and spatially overlapping with the electrostatic field generated by the electrode elements of the sleeve insert.

In many embodiments, the sleeve insert comprises at least two electrically conductive electrode elements, where the electric potential applied to these element may be defined with regard to the housing or another external component, and/or with respect to each other.

Thus, the electromagnetic lens according to the invention will include: (1) A magnetic circuit assembly for the generation of a static magnetic field which can exert a lensing effect on the charged-particle beam propagating through the electromagnetic lens. The magnetic circuit assembly includes one or more cylindrical permanent magnets, which preferably are stacked along and concentric to the optical axis of the system, and accommodated within a housing body made of high-permeability magnetic material, configured to direct magnetic field lines into targeted sections of the optical axis, i.e. defined sections of the passage opening, in particular sections corresponding to the one, two or more gaps provided in the housing body. (2) An electrostatic inlay, provided for the generation of an electric field that can be used to fine-adjust the lensing effect of the electromagnetic lens on the traversing charged-particle beam, and furthermore, where desired, for altering the shape and deflection with respect to the optical axis of the particle beam and possibly also for modifying optical aberrations introduced by the electromagnetic lens itself and/or the charged-particle beam optical apparatus into which the electromagnetic lens is to be incorporated. Furthermore, for operating the electromagnetic lens, a cabling system may be used for interconnecting the elements of the electrostatic inlay, such as the liners and the rods of the multipoles, to external power supply units for individual voltage adjustment.

The inlay according to the invention enables the generation of an electrostatic field superposing to the aforementioned magnetic field, which allows to compensate for the discussed deviation of the magnetic field from design target, by allowing an in-situ fine-adjustment of the focal-length of the lens with high precision, for instance in the order of 10 ppm or below, as well as control of specific properties of the charged-particle beam such as shape and optical aberrations.

Accordingly, the invention significantly facilitates layout, construction, fine-adjustment and controlling of writer tools, and in particular of a multi-column multi-beam mask-writer tool.

In contrast to U.S. Pat. No. 9,165,745, the electromagnetic lens of the invention has a magnetic loop which is completely closed except for a number of air gaps in the housing body, which allow to focus the magnetic field at desired regions of the optical axis, thus strongly reducing the degrading influence of stray fields on the performance of the electromagnetic lens as employed in charged-particle multi-beam nano-patterning apparatuses. This fact can be readily understood in view of Ampere's circuital law. Ampere's law states that the line-integral of the magnetic field around a closed curve is proportional to the total electrical current flowing across a surface enclosed by such a closed curve, which equals zero in a current-free system, as is the case here by virtue of using permanent magnets. Therefore, by employing (at least) two gaps towards the optical axis and by layout generating two (or, multiple) spatially sharply confined magnetic fields of opposing direction in axial direction, acting as magnetic lenses in those regions, the layout enables to fulfill Ampere's law without incurring additional undesired stray-fields. In contrast, for a single gap layout, which generates only one spatially sharply confined magnetic axial field in one direction along the optical axis, Ampere's law predicts the existence of additional (but with respect to the application, undesired) axial magnetic stray-fields along the optical axis in opposing direction. Those fields are charged-particle-optically problematic as they are not spatially sharply-confined, thus leading to unwanted interactions with the beam, and hence aberrations in the system. Therefore, a layout where the generated axial magnetic fields along the longitudinal direction intentionally cancel other each other out (on the whole), minimizes the presence of stray-fields that would otherwise impact not only each sub-column, but also potentially the neighboring sub-columns, and thus, would lead to non-rotationally symmetric distortions in the overall system, which would thus make the system unsuitable for the industries' high-tech node-precision write-quality requirements. This approach to minimize stray fields is not employed in the above mentioned state-of-the-art systems.

For at least the above reasons, the present invention and its application in writer tools such as multi-column multi-beam charged-particle nano-patterning systems for direct writing of substrates, offer a unique combination of magnetic, electrical and calibration components, which is expected to significantly impact the development of high-throughput industrial processes for integrated circuits.

In many embodiments the magnetic circuit has two gaps located at either axial end of the inner yoke shell towards a respectively corresponding portion of the outer yoke shell, wherein each gap generates a defined magnetic field reaching inwards into the passage opening and spatially overlapping with the electrostatic field generated by the electrode elements of the sleeve insert. However, it will be clear that the number of gaps may be higher, such as three or four or more, depending on the individual application of the lens.

Advantageously, the electromagnetic lens will often have an overall rotationally symmetric shape along said longitudinal axis, wherein the inner yoke shell and the outer yoke shell are coaxial to each other.

According to a suitable geometric layout the inner yoke shell may extend between two axial ends thereof along a passage space receiving the sleeve insert, and the outer yoke shell may surround the inner yoke shell radially outward of the inner yoke shell while extending to either sides corresponding to the axial ends of the inner yoke shell.

In many embodiments the at least one ring magnet may have a magnetization oriented substantially radially, and/or may be realized as radially magnetized ring magnet. Furthermore, the at least one ring magnet may be composed of three or more (e.g. four, six, eight) magnet parts arranged uniformly around the longitudinal axis along a circumferential direction. Generally, while the ring magnet will usually have a shape of a hollow cylinder or polygonal hollow prisma, the at least one ring magnet can have a general ring form where ring portions are distributed around the longitudinal axis along the circumferential direction; this may also include gaps of some angular extension between the ring portions. For instance, the magnet parts may be substantially wedge-shaped elements forming sectors with respect to the longitudinal axis. Alternatively to this or in combination with this, the ring magnet (or some or all of the magnet parts) may be composed of two or more layers (segments) stacked along the longitudinal axis.

As one highly advantageous aspect of the invention, the electrode elements may be configured to form a particle-optical lens in conjunction with the magnetic field within the passage opening at one of the gaps, at each one of several of the gaps, or preferably at each gap, and in the case of multiple gaps at each of these gaps a particle-optical lens may be formed. The focal length of such particle-optical lens(es) may be adjustable through modifying the electric potentials applied to the electrode elements. For instance, the electrode elements may often be configured (mechanically and electrically) to form at least one Einzel lens.

Furthermore, in many embodiments of the invention, at least one of the electrode elements may include an electrostatic multipole electrode comprising a number of sub-electrodes arranged uniformly around the longitudinal axis along a circumferential direction.

In many embodiments of the lens of the invention, in particular in those cases where the lens is intended to be used in connection with a PD system, among the electrode elements may be a beam aperture element forming a delimiting opening with a defined radius around the longitudinal axis, the delimiting opening limiting the lateral width of a charged-particle beam propagating along the longitudinal axis. This delimiting opening may be used as a particle-collecting calibration aperture used to collect particles, including those intentionally deflected in a PD system, so as to prevent them from reaching the target of the charged-particle beam. Furthermore, the beam aperture element may be connected to a current measurement device, which may be used e.g. to measure the amount of the charged-particle beam absorbed at the beam aperture element. In front of such a beam aperture element, as seen in the direction of propagation of the beam along the longitudinal axis, it is often advantageous to provide an electrostatic multipole electrode, which comprises a number of sub-electrodes arranged uniformly around the longitudinal axis along a circumferential direction, preferably configured to determine a transversal position of the beam with respect to the longitudinal axis, by applying different suitable electrostatic potentials to the sub-electrodes.

In advantageous embodiments, the sleeve insert may comprise a ceramic body on which the electrode elements are realized as conductive coatings of respectively limited shape and area.

A further aspect of the invention is directed at a charged-particle optical apparatus including an electromagnetic lens according to the invention and configured for influencing a charged-particle beam of said apparatus propagating through the lens along the longitudinal axis thereof, wherein said lens is part of a projection optic system of said apparatus. In particular, the apparatus may preferably realize a multi-column system comprising a plurality of particle-optical columns, each column using a respective particle beam and comprising a respective projection optic system, of which at least one, preferable several and most preferably all, includes a respective electromagnetic lens.

BRIEF DESCRIPTION OF THE DRAWINGS

In the following, in order to further demonstrate the present invention, illustrative and non-restrictive embodiments are discussed, as shown in the drawings, which show schematically:

FIG. 5 shows a cross-sectional view of a multipole electrode having eight sub-electrodes; FIG. 5A shows an enlarged detail of a gap range between two of the rods;

FIG. 6 shows a variant of a multipole electrode having four sub-electrodes in a perspective view;

FIG. 8 shows an embodiment of a ring magnet composed of ring elements having radial magnetization, in a perspective view (FIG. 8A), a longitudinal section (FIG. 8B), and a cross section (FIG. 8c);

FIGS. 9-11 illustrate several embodiments of sectioned ring magnets in respective cross-sectional views.

DETAILED DESCRIPTION OF EMBODIMENTS OF THE INVENTION

The detailed discussion of exemplary embodiments of the invention given below discloses the basic ideas, implementation, and further advantageous developments of the invention. It will be evident to the person skilled in the art to freely combine several or all of the embodiments discussed here as deemed suitable for a specific application of the invention. Throughout this disclosure, terms like "advantageous", "exemplary", "typical", or "preferred" indicate elements or dimensions which are particularly suitable (but not essential) to the invention or an embodiment thereof, and may be modified wherever deemed suitable by the skilled person, except where expressly required. It will be appreciated that the invention is not restricted to the exemplary embodiments discussed in the following, which are given for illustrative purpose and merely present suitable implementations of the invention. Within this disclosure, terms relating to a vertical direction, such as "upper" or "down", are to be understood with regard to the direction of the particle-beam traversing the electromagnetic lens, which is thought to run downwards ("vertically") along a central axis (or longitudinal axis). This longitudinal axis is generally identified with the Z direction, to which the X and Y directions are transversal.

Electromagnetic Lens

Figure 1:
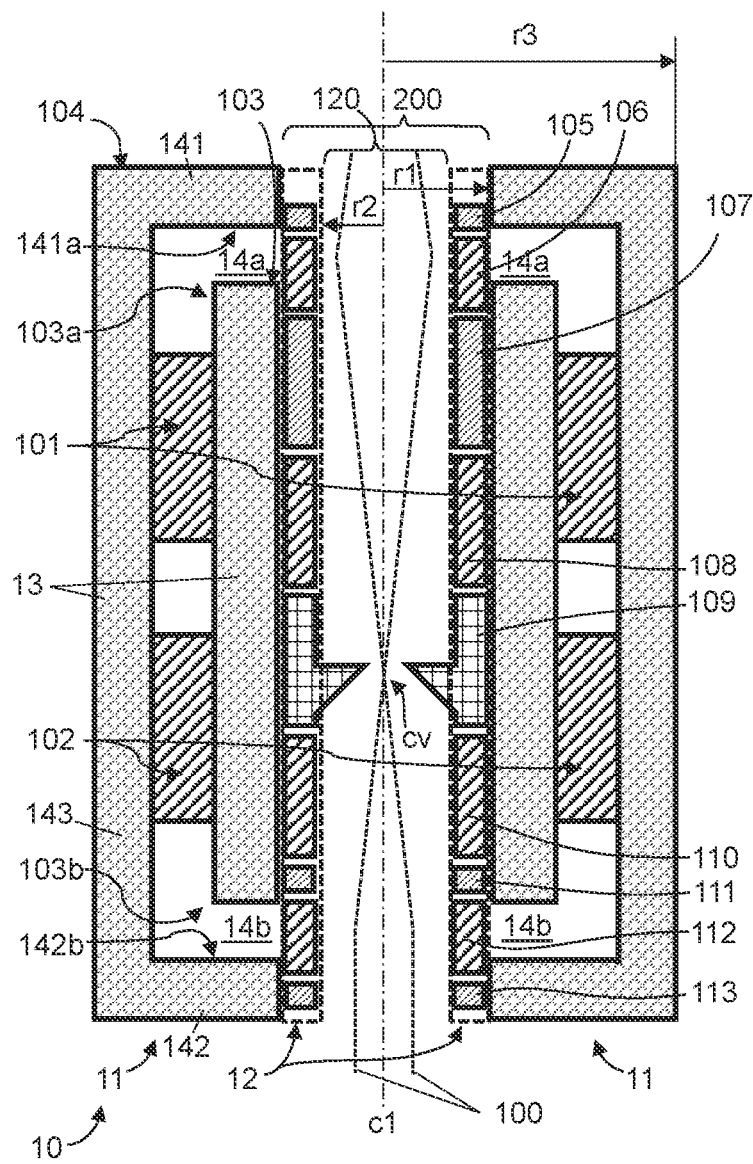
FIG. 1 is a longitudinal sectional view of an electromagnetic lens according to a first embodiment of the invention.

FIG. 1 depicts an electromagnetic lens 10 according to a first embodiment of the invention, in a longitudinal sectional view, i.e. along a section plane passing through its central axis c1. For the sake of better clarity, the components are not shown to size. The lens 10 may be used to implement the final lens 414 of the writer tool 401 of FIG. 4 (see below), where it is used as objective lens, but it will be appreciated that it is suitable for use in many other particle-optical devices which may implement a multi-column or single-column architecture, as disclosed in U.S. Pat. Nos. 9,443,699 and 9,495,499 of the applicant, and the disclosure of those documents are herewith included by reference into the present disclosure The electromagnetic lens 10 includes a magnetic circuit assembly 11 and a sleeve insert 12, which is also referred to as beam-control inlay or simply "inlay". The magnetic circuit assembly 11 comprises one or more ring magnets 101, 102 made of a permanent magnetic material, which have 10 to 13 mm outer radius, 2 to 5 mm (radial) thickness, and are about 25 mm long, and typically will have a remanence of about 1 T; as well as a housing body 13 which also serves as a yoke body for the ring magnets. Such a housing body consisting of two concentric cylinders with inner radius r1 of around 5 mm and outer radius r3 of about 15 mm, where each of the cylinders has a thickness of 2 to 5 mm, and a length between 50 mm and 100 mm. The sleeve insert 12, which is also referred to as beam-control inlay or simply "inlay", comprises several electric active and passive components acting as electrostatic electrodes, apertures, or field-termination caps, which have outer diameters below 5 mm and lengths between 1 mm and 20 mm, as discussed in detail below. The lens 10 is usually arranged in a particle-beam exposure system (such as the writer tool 401 of FIG. 4) such that its central axis c1 coincides with the optical axis of the exposure system; but the skilled person will appreciate that also other relative arrangements may be chosen depending on the application of the electromagnetic lenses according to the invention. The dotted lines 100 symbolize an envelope of the particle beam as it propagates through the electromagnetic lens 10 within the particle-beam exposure system.

Magnetic Circuit Assembly

The magnetic circuit assembly 11 is discussed in the following. The housing body 13 comprises an internal part and an external part, referred to as inner yoke shell 103 and outer yoke shell 104, respectively, with the latter encasing the ring magnets 101, 102, the inner yoke shell 103, as well as the inlay 12 when the latter is mounted into the lens 10. Both the magnets 101, 102 and the housing body 13 are concentric with respect to the central axis c1. The ring magnets 101, 102 preferably have the shape of rotationally symmetric rings or ring sectors. The sizes of the ring magnets are chosen as suitable for the respective application and charged-particle apparatus; in the shown embodiments the geometric dimensions are typically in the order of several millimeters (e.g., 12 mm outer radius, 3 mm thickness, and about 25 mm in length). Multiple magnets may be used, which are preferably arranged in a sequential stacking along the longitudinal axis of the system (FIG. 8A).

Figure 2:
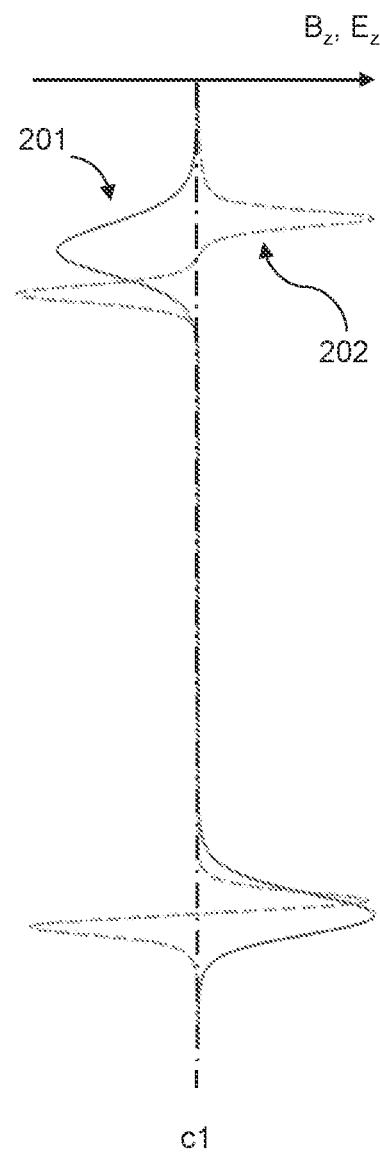
FIG. 2 shows the strength of the axial components of the magnetic field (solid line) and the electric field (dashed line) at the location of the central axis c1 as a function of the longitudinal coordinate; the longitudinal coordinate is the same (and in particular at the same scale) as in FIG. 1.

In a preferred embodiment of the invention, the permanent magnets forming the ring magnets 101, 102 exhibit radial magnetization (see discussion regarding FIGS. 8 and 9 below). The ring magnets act as a source of the magnetic flux in a magnetic circuit realized in the magnetic circuit assembly 11. The inner yoke shell 103 is, e.g., realized as a hollow cylinder of sufficient length so as to protrude from the stack of ring magnets at both ends. The outer yoke shell 104 is, e.g., realized having a cylindrically symmetric shape having double C-like longitudinal section; in other words, it comprises a central body portion 143 shaped as a hollow cylinder, which is concentric with the hollow cylinder of the inner yoke shell 103 but with a larger radius, and two end parts 141, 142 of disk-like shape with a central bore, attached at both longitudinal ends of the central body portion 143. The central bore of each end part 141, 142 preferably has an inner radius which is the same as the inner radius of the hollow cylinder body of the inner yoke shell 103. Thus, the central bores and the hollow space of the inner yoke shell surround a passage space 200 (of radius r1) traversing the magnetic circuit assembly 11 along the axis c1. The geometric dimensions of the hollow-cylinder portions 103, 143 are chosen suitably such that the cylinders envelope the magnets 101, 102 inwardly and outwardly; they advantageously contact the respective faces of the magnets minimizing or preferably avoiding a gap between the magnets and the respective surface areas of the cylinder bodies. In contrast gaps 14a, 14b are provided between the end faces 103a, 103b of the inner yoke shell and the corresponding inner faces 141a, 142b of the end parts of the outer yoke shell, which represent pole-pieces of the magnetic circuit 11. The radial thickness of the hollow cylinders is typically, and without loss of generality, in the order of a few millimeters. The inner and outer yoke shells 103, 104 of the housing body 13 are made of a magnetically permeable material, preferably of high magnetic permeability (such as ferrimagnetic or ferromagnetic material); and by virtue of its shape it can enhance and concentrate the magnetic flux generated by the magnets. Around the regions of the gaps 14a, 14b, the magnetic flux of the circuit will also generate a defined magnetic field of magnetostatic type reaching inwards into the passage space 200 at specific portions of the central axis c1. Thus, in accordance with the invention, the housing body act as yokes of a magnetic lens, where the distribution of the magnetic flux is formed by the pole-pieces 103a, 103b, 141a, 142b. In particular, with respect to the passage space 200, the magnetic field generated by the magnetic circuit 11 is restricted to two regions: namely, an upper region within the gap 14a, formed by the pole piece faces 103a, 141a; and an lower region within the gap 14b, formed by the pole piece faces 103b, 142b. Thus, two magnetic lenses are formed at the portions of the longitudinal axis corresponding to the gaps 14a, 14b respectively. The magnetic field comprises an axial component and a radial component; while the radial component is of little importance, the resulting axial component of the magnetic field $B_z$ is exploited for the lens effect of the electromagnetic lens. The strength 201 of the axial component of the magnetic field $B_z$ at the location of the central axis c1 as a function of the longitudinal coordinate is depicted in FIG. 2 (solid line); a typical value of the peak value of the magnetic field $B_z$ is in the order of 0.1 T in applications where the charged particles are electrons. Thus, the magnetic circuit will generate two regions of (comparatively) high magnetic field intensity, which will act as two consecutive magnetic lenses with well-defined focal lengths and optical aberrations. Magnetic coupling of the two lenses via a common yoke 13 strongly reduces the effect of magnetic stray fields in regions other than the regions of the gaps 14a, 14b, which would otherwise be inevitably associated with permanent magnets in particle lenses of conventional layouts.

Inlay

The lens 10 further comprises a sleeve insert or inlay 12, which is inserted into the passage space 200 of the housing body 13 along the optical axis c1. Correspondingly, the physical dimensions of the inlay 12 are appropriately chosen with respect to the housing body 13 discussed above. The inlay 12 comprises a number of beam control elements, including one or several electrically active elements that are employed to generate an adjustable electrostatic field 202 (dashed line in FIG. 2) superposing the magnetostatic field 201 (solid line in FIG. 2) in the passage space. The beam control elements are generally ring-shaped components serving as electrically active elements, and they are stacked along the central axis c1 and oriented with their geometric axes concentric and parallel to the central axis c1, having a common inner diameter r2; thus they define a passage opening 120 which transverses the lens 10 along the central axis c1 and which serves as channel for the beam-path during operation of the magnetic lens. In the embodiment shown in FIG. 1, the beam control elements comprise, going downwards in FIG. 1, a first liner 106, two multipole electrodes 108, 110, and a second liner 112—all made of electrically conductive material. Each of the multipole electrodes 108, 110 is, e.g., realized as a composite metallic ring, composed of multiple sections of equal arc length as further discussed below with reference to FIG. 6; their (radial) thickness is, e.g., below 2 mm, and their lengths between 5 mm and 20 mm. In addition, preferably an electrically passive ring 109 is interposed between the two multipoles 108, 110; the component is referred to as calibration aperture, which is further discussed below. While the multipoles 108 and 110 are composed of a plurality of sector components arranged around the central axis c1 along the circumferential direction (for instance, and without loss of generality, 4, 6 or 8 sector components each), all other inlay elements are preferably rotationally symmetric with respect to the central axis c1. Electrically active elements 106, 108, 110, 112 may preferably be connected to respective power supplies 726, 728, 730, 732 of electrostatic voltages so that their electrostatic potentials can be individually adjusted (FIG. 7); in a variant, the power supplies may be combined in a common power supply device which provides the individual supply voltages. Finally, the electrically active elements 106, 108, 109, 110, 112 are electrically separated from each other and terminated at both ends by elements referred to as field termination caps 105, 107, 111, 113, whose electric potential is same as the housing body 13. The field termination caps 105, 107, 111, 113 serve to confine the electric field to the inner space 120 of the inlay; they thus provide a well-defined "field boundary" of the inlay towards surrounding components (such as other particle-optical columns 409, see FIG. 4). The spaces between the field termination caps 105, 107, 111, 113 and respective neighboring electrically active elements 106, 108, 109, 110, 112 are electrically insulating, e.g. realized as vacuum or filler material using a non-conductive, preferably voltage-resistant, material such as ceramics. The various elements 105-113 of the inlay are supported and held together by a supporting ring body of hollow-cylindrical shape (between radii r1 and r2) and made of electrically insulating material such as e.g. ceramic or plastic, symbolized in FIG. 1 by two dashed rectangles. The electrode elements may be realized, for instance, as discrete ring-shaped elements joined and held together within the ring body, or as conductive coatings formed at the inner surface of the ring body, so as to have respectively limited shape and area. The strength 202 of the electric field $E_z$ (axial component, i.e. along Z-direction) as function of the coordinate along the axis c1 is depicted in FIG. 2 (dashed line); a typical value of the peak value of the electric field $E_z$ is in the order of $10^5$ V/m.

In a typical embodiment, the first and second liners 106, 112 are between 2 mm and 10 mm long and have a small radial thickness e.g. below 2 mm. Each liner 106, 112 is placed corresponding to one of the magnetic flux regions of the gaps 14a, 14b, respectively, that act as magnetostatic lenses. In particular, the liners 106, 112 can be used as Einzel lenses in order to generate an electrostatic field 202 of, e.g., the order of $10^5$ V/m superposing the magnetic field 201. This allows fine adjusting of the focal length of the corresponding magnetic lenses, and the system is provided with a certain adjustment range for the focal length. Without the liners 106, 112, the accuracy of the focal length would suffer from limited precision in mechanical manufacturing, assembly accuracy limitations, and magnetization accuracy of the permanent magnets 101, 102, which is typically in the order of 0.5% to 1%. However, with respect to the purpose of a magnetic lens as intended by the applicant, a precision of even below 0.1% would be desired. In addition, permanent magnets are known to have aging effects, i.e. often the magnetic field becomes weaker over time, and change strength depending on temperature. Thus, using permanent magnets in an charged-particle-optical application, requires suitable compensation means for these various effects. The invention, also by including integrated corrections means, allows to overcome all the above-mentioned limitations relating to manufacturing, assembly, magnetization strength and aging effects, as electric fields can be adjusted and controlled with a precision in the ppm (parts-per-million) regime. In addition, the voltages of the liners can be adjusted in combination with other optically and electrically active elements of the system, in order to change the property of the particle-beam exposure apparatus with respect to optical aberrations and/or alter the height of the image-plane produced by the lens with respect to the target.

Figure 3:
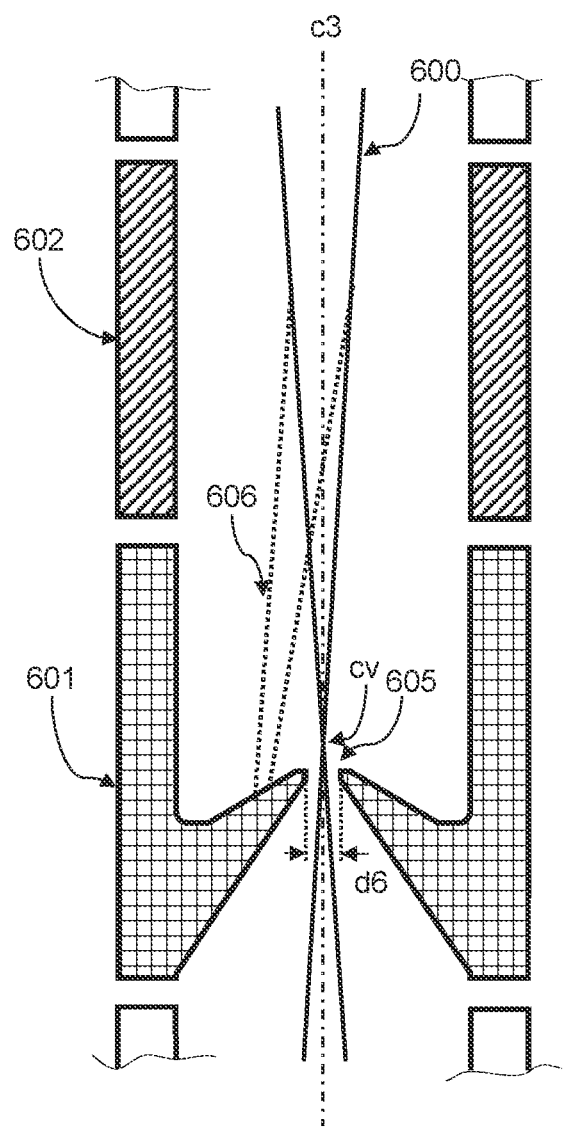
FIG. 3 shows an enlarged detail of the calibration aperture and a preceding multipole as components of the sleeve insert of the electromagnetic lens of FIG. 1.

Referring to FIGS. 1 and 3, the inlay 12 may preferably include a passive element referred to as calibration aperture 109, which serves as a stopping component for deviating or deflected parts of the particle beam. FIG. 3 shows an enlarged detail of a longitudinal section of the calibration aperture. The calibration aperture 601 is provided with an inner ring structure projecting towards the axis c1, thus forming an aperture of small diameter d6. The aperture serves to limit the size of the beam 600 traversing the inlay 12 by absorbing the parts 606 of the beam which travel outside of the diameter d6. In a preferred embodiment of the invention, one of the preceding inlay elements, for instance a multipole electrode 602, is configured to steer the beam 600 along a direction transversal to the axis c1 by applying a dipole field (typically using voltage in the range of ±50 V for instance). The multipole electrode 602 enables defining the transversal location of the beam 600, 606 with respect to the longitudinal axis c1, by varying the dipole voltage applied to selected electrodes of the multiple electrode in at least two linearly independent directions, which can also be used for beam alignment. In the particle-beam columns of the writer tool 401 described above, the particle beam is split into a bundle of beamlets that can selectively pass through the pattern-definition system 412 with or without an additional deflection, introduced by said pattern-definition system. Such deflection is introduced in order to prevent the beamlets from reaching target and hence define a writing pattern. The deflected beamlets will reach an area beside the calibration aperture 600, rather than traveling through it, and will thus be absorbed therein, without causing unwanted charge-up of other parts of the system, which could otherwise generate undesired stray electric fields. For this purpose, the beam calibration aperture is shaped as a cylinder that is, e.g., about 20 mm long and has a hook-like cross-section at the bottom (605) with a minimum diameter of a few hundreds of micrometer. The absorption of the beam parts 606 will cause generation of an electric charge in the element forming the calibration aperture 601, which may be eliminated, i.e. drained off, through the electric connection of the beam aperture, for instance towards a measuring device 720 as discussed below with reference to FIG. 7. The inlay 12 is usually inserted into the passage space 200 of the housing body 13 such that its longitudinal axis c3 coincides with the central axis c1 of the housing body 13.

In a variant of the inlay, one or more of the electrode elements of the inlay may be geometrically shaped in a way such that the aberrations of the system are intentionally changed or kept constant within a defined range of supply voltages. To achieve this purpose, the respective electrode(s) may have a modified shape, such as having a cross-section with a tipped shape towards the longitudinal axis, thus realizing a constricted inner diameter, and are applied a suitable electric potential with respect to ground potential.

Figure 3A:
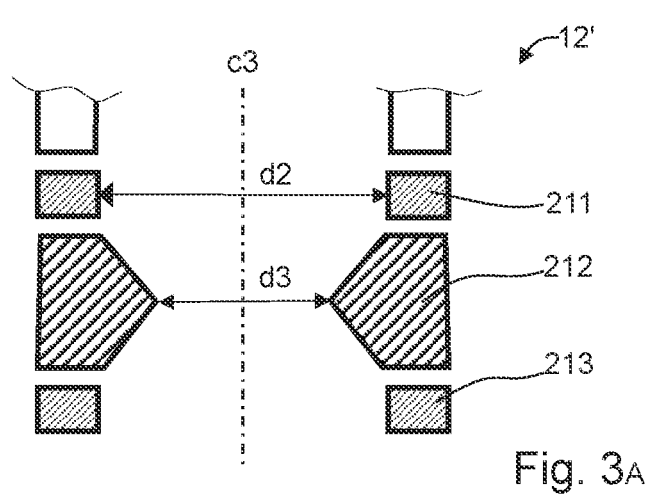
FIG. 3A shows an enlarged detail of the lower portion of the sleeve insert of a variant embodiment which comprises a modified liner which allows to alter optical aberrations

FIG. 3A illustrates one exemplary embodiment of an inlay 12' comprising a liner 212 having a constriction of inner diameter. FIG. 3A is a detail of the "bottom" end of the inlay 12'. By virtue of the constriction to a reduced inner width, i.e. diameter d3, the liner 212 allows to alter aberrations. In particular, if the diameter of the beam in the area of liner 212 is approximately 70% of the diameter d3 or larger, significant spherical aberrations are induced, which could then be used e.g. to alter radial spatial or angular distortions, or the image-field curvature. In other respects, the inlay 12' corresponds to the inlay 12 discussed above, in particular the field termination caps 211, 213 having an inner diameter d2=2·r2 at either sides of the liner 212 may be realized identical to the field termination caps 111, 113.

Lithographic Apparatus

Figure 4:
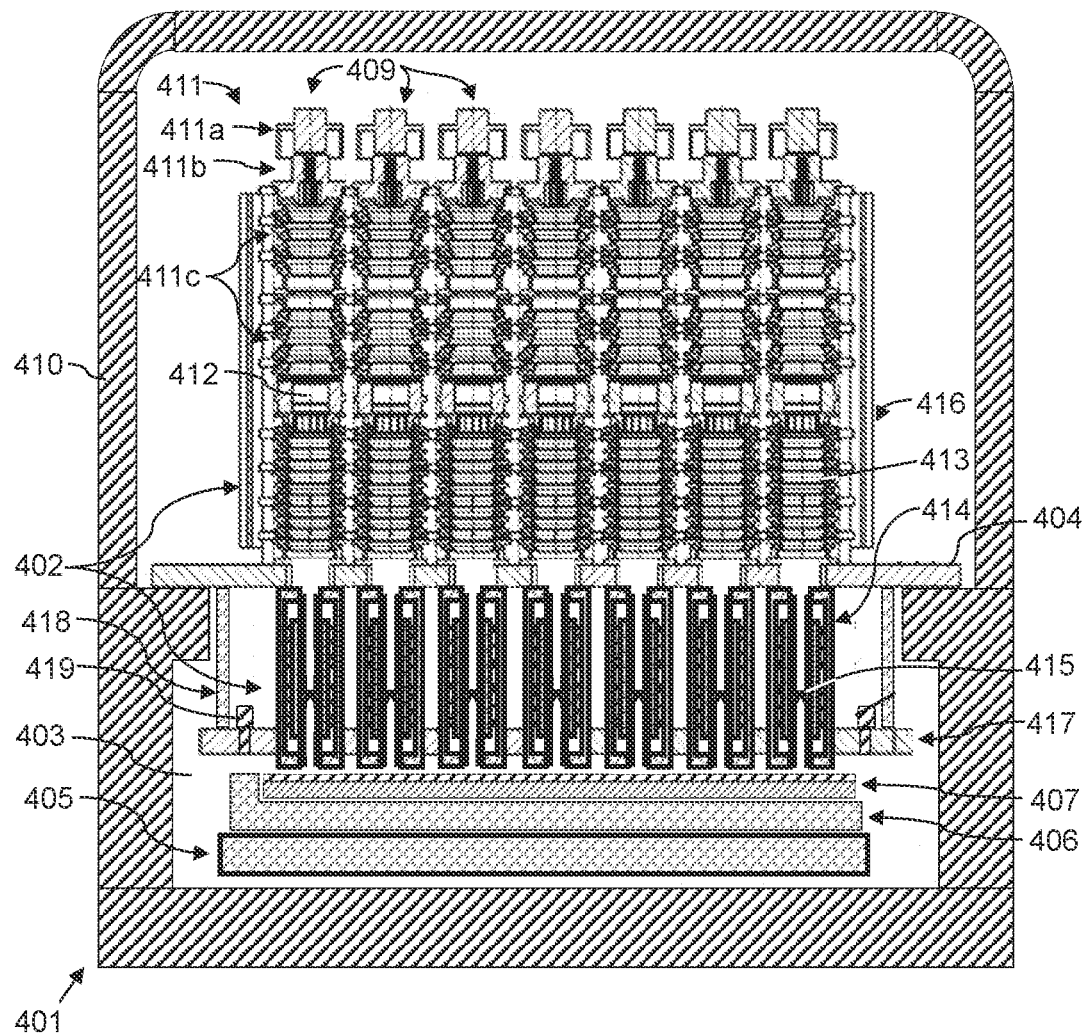
FIG. 4 is a longitudinal sectional view of a multi-column writer tool incorporating a plurality of instances of the electromagnetic lens of FIG. 1.

FIG. 4 shows a schematic sectional view of a multi-column writer tool 401 incorporating an electromagnetic lens according to one embodiment of the invention. The writer tool employs a charged-particle beam formed from charged particles which may be electrons or ions (for instance ions of positive electric charge).

The writer tool 401 comprises a vacuum housing 410 for the multi-column charged-particle optics 402, a target chamber 403 onto which the multi-column charged-particle optics is mounted by means of by means of a column base plate 404. Within the target chamber 403 is an X-Y stage 405, e.g. a laser-interferometer controlled air-bearing vacuum stage onto which a substrate chuck 406, preferably an electrostatic chuck, is mounted using a suitable handling system. The chuck 406 holds the substrate 407 serving as target, such as a silicon wafer with an electron or ion beam sensitive resist layer.

The multi-column optics 402 comprises a plurality of sub-columns 409 (the number of columns shown is reduced in the depiction for better clarity, and represent a much larger number of columns that are present in the multi-column apparatus in a realistic implementation). Preferably, the sub-columns 409 have identical setup and are installed side-by-side with mutually parallel axes. Each sub-column has an illuminating system 411 including an electron or ion source 411a, an extraction system 411b, and an electrostatic multi-electrode condenser optics 411c, delivering a broad telecentric charged-particle beam to a pattern definition (PD) system 412 being adapted to let pass the beam only through a plurality of apertures defining the shape of sub-beams ("beamlets") permeating said apertures (beam shaping device), and a demagnifying charged-particle projection optics 416, composed of a number of consecutive electro-magneto-optical projector stages, which preferably include electrostatic and/or magnetic lenses, and possibly other particle-optical devices. In the embodiment shown in FIG. 4, the projection optics 416 comprises e.g. a first lens 413 which is an accelerating electrostatic multi-electrode lens, whereas a second lens 414, located downstream of the first lens, is realized using an electromagnetic lens according to the invention, such as lens 10 of the first embodiment (FIG. 1).

In each sub-column 409, the first lens 413 of the projection optics forms a first cross-over of the particle beam, whereas the second lens 414 forms a second cross-over. In the second lens a beam aperture 415 (corresponding to the beam aperture 109 of FIG. 3) is configured to filter out beam parts which deviate from the respective optical axis since they have been deflected in the PD system. Each second lens 414 of the sub-columns may be preferably mounted on a reference plate 417 which is mounted by suitable fastening means 418 onto the column base plate 404. Mounted onto the reference plate 417 are parts 419 of an off-axis optical alignment system.

The reference plate is fabricated from a suitable base material having low thermal expansion, such as a ceramic material based on silicon oxide or aluminum oxide, which has the advantage of little weight, high elasticity module and high thermal conductivity, and may suitably be covered with an electrically conductive coating, at least at its relevant parts, in order to avoid charging (by allowing electrostatic charges being drained off).

The PD system 412 serves to form the particle beam into a plurality of so-called beamlets which contain the information of the pattern to be transferred to the target. The structure, operation and data-handling of the PD system are disclosed in U.S. Pat. Nos. 9,443,699 and 9,495,499 of the applicant, and the disclosure of those documents are herewith included by reference into the present disclosure.

Multipole Electrodes

As mentioned, the inlay comprises multipole electrodes 108 and 110. Each of the multipole electrodes 108, 110 is composed of three or more metallic ring sectorial components serving as electrodes of the multipole electrode (sub-electrodes), which hereinafter are also called rods. Preferably, the rods are of identical geometry. A depiction of a multipole electrode 511 with eight rods 508 (sectorial electrodes) in a cross-sectional view is shown in FIG. 5; FIG. 5A shows an enlarged detail of a gap range between two of the rods. FIG. 6 shows a variant of a multipole electrode 540 with four sectorial electrodes 544. Preferred numbers of rods within a multipole electrode are four, six, eight, twelve or sixteen, depending on the desired effects to be achieved.

Figure 7:
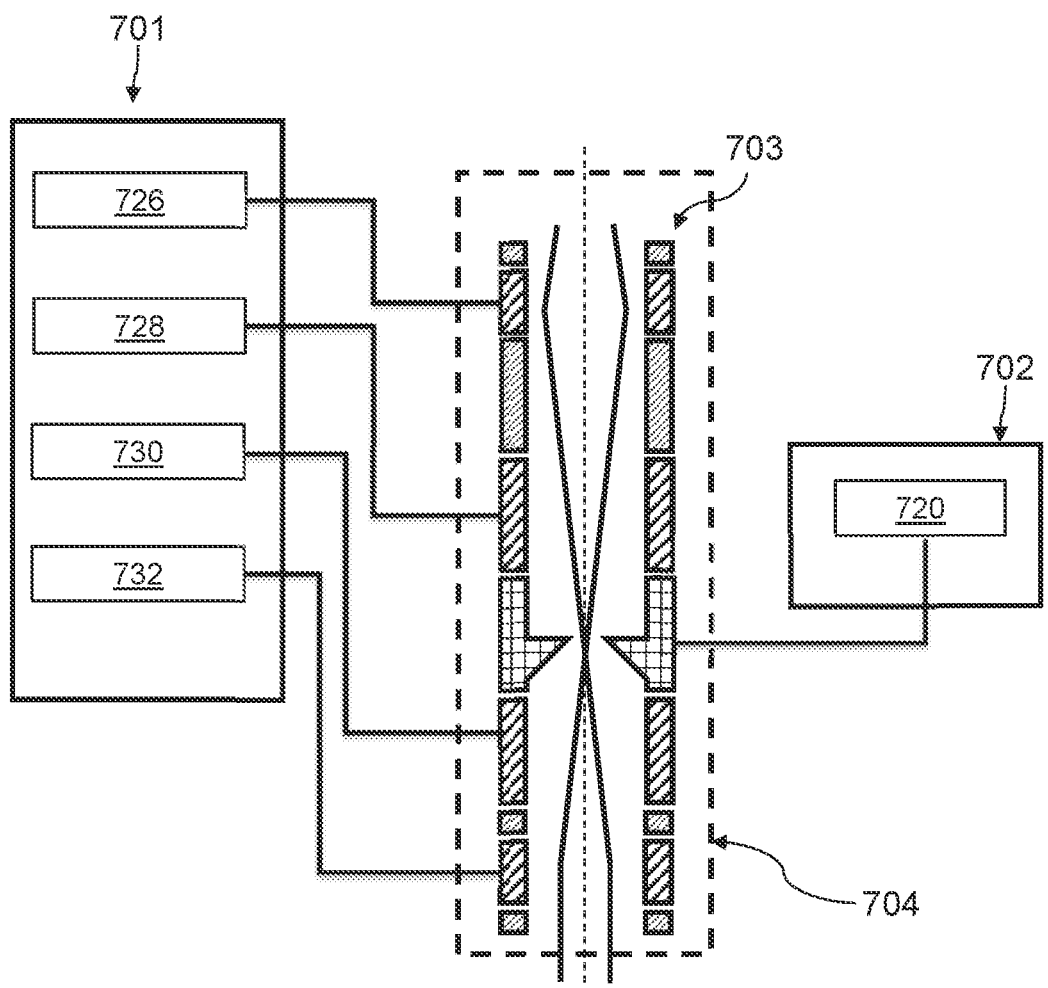
FIG. 7 is a schematic overview of the electric voltage supplies connected to the sleeve insert elements of the lens of FIG. 1.

Referring to FIG. 5, the rods 508 are located within a surrounding sleeve serving as support 501. The rods 508 can be individually applied electric potentials by means of their respective external power supply units 728, 730 (FIG. 7). Additionally, a global offset voltage may be applied to have them behave as additional electrostatic lenses. By virtue of the different voltages applied to the individual rods 508 various field configurations of dipole, quadrupole or higher order electrostatic fields can be realized, with the purpose of shaping the particle beam crossing their corresponding transversal section of the optical axis 503. With respect to a typical application in the context of the embodiment of FIGS. 1-3, the voltages applied to the rods 508 are typically in the order of up to a few tens of volts. Such beam shaping can be used to compensate for errors due to imperfections of the optical system, such as magnetic inhomogeneities, mechanical manufacturing and/or assembly accuracies. In this respect, the multipoles can correct the beam position with respect to the optical axis 503 when used as dipoles, whose directions in the plane defined by the X and Y axes can be arbitrary if at least four different voltages +V1 (hatched rods to the right hand side), −V1 (hatched rods to the left hand side), +V2 (cross-hatched rods to the top), −V2 (cross-hatched rods to the bottom) are applied to the rods. Additionally, it is possible to compensate for astigmatism or other higher-order distortions by the multipoles when the latter are used as quadrupole or higher-order multipoles, by applying suitable voltages at the individual rods, in a manner similar to the dipole case. As for the liners 106, 112, also the common offset potential of multipole electrodes 108, 110 may be adjusted in order to tune optical aberrations of the magnetic lenses formed by the lens 10. The gaps 505 between the sectorial electrodes forming the rods 508 are advantageously angled (or zig-zag shaped, "labyrinth"), so as to avoid that particles 504 diverting from the beam which propagates within the central space of the multiple electrode can travel to the outside of the multiple electrode, possibly affecting the support 501 or other outer components, but will impinge on a surface of a rod. At the outer sides of the rods 508 the gaps 505 end in pouches which serve to collect the particles and drain their electric charge to a drain electrode (not shown). This serves to avoid the build-up of electric charges and associated stray electric fields which otherwise might affect the charged-particle beam propagating through the multipole electrode 511.

Furthermore, by appropriate choice of the electric multipole and the location and shapes of the rods and applying a suitable common supply voltage to all rods of a multipole electrode, it is possible to achieve a change in the focal length of one or both of the magnetic lenses corresponding to the two gaps 14a, 14b formed by the yokes.

Referring again to FIG. 1, advantageously the two magnetic lenses may be used for realization of a so-called cross-over cv of the particle beam. In FIG. 1 the dotted envelope lines 100 indicate the evolution of the beam size (cross section diameter) along the optical axis (c1). As already mentioned, a first magnetic lens is formed at the level of the first gap 14a, and this first lens can be used to focus the beam, so it converges into a crossover cv, i.e. a position or region where the lateral width of the beam attains a minimum. The magnetic lens is advantageously configured so as to create the crossover cv at a position located at, or in the vicinity (e.g. 10 mm or less) of the longitudinal location of the calibration aperture 109 into a crossover cv. Thereafter, the beam diverges again and traverses a second magnetic lens formed at the level of the second gap 14b, which preferably has the effect of making the beam telecentric again (with respect to the source of the particle beam). Thus, the beam forms the image of the apertures that shape the beam in the PD system 412 so that the images are produced at the target 407. Therefore, it is highly desired that an accurate matching of the focal lengths of the two lenses be ensured for a successful image formation at the target. In this context, the liners 106, 112 are crucial elements for the correct functioning of the system. Focusing the beam at the location of the calibration aperture 109 makes the latter particularly useful for beam-alignment procedures, where the beam 600 can be scanned across the aperture 605, while corresponding current measurements 720 (or measurements of charge accumulation) serve to monitor the beam location in order to center the beam to the optical axis c1.

FIG. 7 shows a schematic overview of the electric voltage supplies 701 for the inlay 703 and the monitoring device 702 carrying out the current measurement 720. It should be remarked that the multipole electrodes 108, 110, could be used as (quasi-)static or as dynamic elements, i.e. having time-varying voltages, depending on the application. Indeed, the upper multipole electrode 108 may be used in a time-varying dipole configuration to deflect the beam during the scanning across the calibration aperture 605. Moreover, with the lower multipole electrode 110 it is possible to keep the beam aligned with respect to the target 407 on a moving stage 405. The skilled person will appreciate that the mentioned uses of beam control elements are mentioned as exemplary applications and not as restrictions on the functionalities that can be accomplished with the present invention.

Ring Magnets

FIG. 8 illustrates one embodiment of a ring magnet 80 suitable for being used as a component of a magnetic circuit of a lens according to the invention (e.g. as one of the ring magnets 101, 102 of FIG. 1). FIG. 8A is a schematic perspective view, FIG. 8B a schematic sectional view along the longitudinal axis c8, and FIG. 8c a corresponding schematic cross-sectional view; the dimensions are not to scale. The ring magnet 80 is composed of a number of ring magnet elements 81 stacked in a co-axial arrangement along the common longitudinal axis c8. Each of the ring magnet elements 81 has a radially oriented magnetization, as indicated by dashed arrows in FIG. 8C, so as to have e.g. a "north" pole N formed towards the inner space of the ring magnet 80, whereas the outer sides represent the "south" pole type S of the magnetization. Ring magnet elements having radial magnetization as shown are commercially available, made of a ferromagnetic material such as sintered NdFeB, $SmCo_5$ or ferrite. The ring magnet elements are joined by gluing or clamping or any other suitable means. The number of the ring magnet elements 81 in a ring magnet 80 may be any number, such as one, two, three or more, depending on the dimension (in particular height) of the elements and the desired dimensions of the ring magnet 80.

The ring magnets or each of the ring magnet elements may also be realized by combining a number of ring-sector components, e.g. four or eight at each level, as illustrated in FIGS. 9 to 11 which show explosion views of sector-composed ring magnets, and the respective magnetization is indicated by dashed arrows pointing from "south" to "north" type magnetic poles. In particular, FIG. 9 shows a ring magnet 90 composed of eight ring-sectors 98; FIG. 10 shows a ring magnet 91 composed of four ring-sectors 94 which are radially magnetized with respect to the longitudinal axis c9 at the center of the ring; and FIG. 11 shows a ring magnet 99 composed of four ring-sectors 95 having linear magnetization, e.g. oriented along their respective central symmetry line. In these embodiments, the ring-sectors are magnetized either radially (FIGS. 9 and 10) or linearly (FIG. 11), in order to approximate a ring magnet of ideal radial magnetization. Note that the gaps shown in FIGS. 9-11 between the ring-sectors are only for better clarity; they are not present in an actual embodiment since the gaps are closed or minimized by direct contact of the neighboring components, joined together by gluing, clamping or other suitable methods of joining the sectorial elements 98, 94, 95.

What is claimed is:

1. An electromagnetic lens configured to modify a charged-particle beam of a charged-particle optical apparatus, the electromagnetic lens being provided with a passage opening extending along a longitudinal axis and allowing passage of the charged-particle beam, the electromagnetic lens comprising:
   a magnetic circuit assembly comprising at least one ring magnet and a yoke body; and
   a sleeve insert,
said sleeve insert surrounding the passage opening and extending between a first end and a second end thereof along the longitudinal axis, wherein the sleeve insert comprises at least one electrically conductive electrode element, said at least one electrically conductive electrode element being configured to be applied a respective electric potential via power supplies so as to generate an electrostatic field within the passage opening,
said yoke body comprising an outer yoke shell and an inner yoke shell, arranged circumferentially around the longitudinal axis and comprising a magnetically permeable material, wherein the inner yoke shell is arranged surrounding at least a central portion of the sleeve insert, and the outer yoke shell surrounds the inner yoke shell and the sleeve insert,
said at least one ring magnet arranged circumferentially around the inner yoke shell and arranged between the inner and outer yoke shells, said at least one ring magnet comprising a permanent magnetic material being magnetically oriented with its two magnetic poles towards the inner yoke shell and the outer yoke shell, respectively,
wherein in the magnetic circuit assembly, the inner yoke shell, the at least one ring magnet, and the outer yoke shell form a closed magnetic circuit but having at least two gaps located at respective axial ends of the inner yoke shell towards respectively corresponding portions of the outer yoke shell, wherein the magnetic circuit assembly is configured to generate a magnetic field reaching inwards into the passage opening and spatially overlapping with the electrostatic field generated by the at least one electrically conductive electrode element of the sleeve insert.

2. The electromagnetic lens of claim 1, wherein said closed magnetic circuit has two gaps, said two gaps being located at either axial end of the inner yoke shell towards a respectively corresponding portion of the outer yoke shell, the magnetic circuit assembly generating, at each gap, a defined magnetic field reaching inwards into the passage opening, the electrostatic field generated by the at least one electrically conductive electrode element of the sleeve insert being configured to at least partially overlap with the magnetic field generated at each gap.

3. The electromagnetic lens of claim 1, having an overall rotationally symmetric shape along said longitudinal axis, wherein the inner yoke shell and the outer yoke shell are coaxial to each other.

4. The electromagnetic lens of claim 1, wherein the inner yoke shell extends between two axial ends thereof along a passage space receiving the sleeve insert, and the outer yoke shell surrounds the inner yoke shell radially outward of the inner yoke shell and extends to either side in an axial direction corresponding to the axial ends of the inner yoke shell.

5. The electromagnetic lens of claim 1, wherein the at least one ring magnet has a magnetization oriented substantially radially.

6. The electromagnetic lens of claim 1, wherein the at least one ring magnet is composed of two or more layers stacked along the longitudinal axis.

7. The electromagnetic lens of claim 1, wherein the at least one ring magnet is composed of three or more sectors arranged uniformly around the longitudinal axis along a circumferential direction,
   wherein preferably the three or more sectors are substantially wedge-shaped elements forming the three or more sectors with respect to the longitudinal axis.

8. The electromagnetic lens of claim 1, wherein the at least one electrically conductive electrode element is configured to form a particle-optical lens in conjunction with the magnetic field within the passage opening at one or more of the at least two gaps, preferably at each gap, wherein a focal length of said particle-optical lens is adjustable through modifying the respective electric potential applied to the at least one electrically conductive electrode element.

9. The electromagnetic lens of claim 1, wherein the at least one electrically conductive electrode element comprises a plurality of electrode elements that are configured to form at least one Einzel lens.

10. The electromagnetic lens of claim 1, wherein the at least one electrically conductive electrode element comprises a plurality of electrode elements including an electrostatic multipole electrode comprising a number of sub-electrodes arranged uniformly around the longitudinal axis along a circumferential direction.

11. The electromagnetic lens of claim 1, wherein the at least one electrically conductive electrode element includes a beam aperture element forming a delimiting opening with a defined diameter around the longitudinal axis, the delimiting opening limiting a lateral width of the charged-particle beam propagating along the longitudinal axis.

12. The electromagnetic lens of claim 11, wherein the beam aperture element is connected to a current measurement device to measure an amount of current imparted by the charged-particle beam that is absorbed at the beam aperture element.

13. The electromagnetic lens of claim 11, wherein in front of said beam aperture element, as seen in a direction of propagation of the charged-particle beam along the longitudinal axis, an electrostatic multipole electrode is provided, which comprises a number of sub-electrodes arranged uniformly around the longitudinal axis along a circumferential direction, preferably configured to determine a transverse position of the charged-particle beam with respect to the longitudinal axis.

14. The electromagnetic lens of claim 1, wherein the sleeve insert comprises a ceramic body on which the at least one electrically conductive electrode element is realized as conductive coatings of respectively limited shape and area.

15. A charged-particle optical apparatus including an electromagnetic lens according to claim 1 and configured for influencing the charged-particle beam of said charged-particle optical apparatus propagating through the electromagnetic lens along the longitudinal axis thereof, wherein said electromagnetic lens is part of a projection optical system of said charged-particle optical apparatus,
   wherein preferably the charged-particle optical apparatus is a multi-column system comprising a plurality of particle-optical columns, each column using a respective particle beam and comprising a respective projection optical system which includes a respective electromagnetic lens.

* * * * *